(12) United States Patent
Haley

(10) Patent No.: US 6,948,133 B2
(45) Date of Patent: Sep. 20, 2005

(54) SYSTEM FOR DYNAMICALLY CONFIGURING A USER INTERFACE DISPLAY

(75) Inventor: John D. Haley, Honey Brook, PA (US)

(73) Assignee: Siemens Medical Solutions Health Services Corporation, Malvern, PA (US)

( * ) Notice: Subject to any disclaimer, the term of this patent is extended or adjusted under 35 U.S.C. 154(b) by 576 days.

(21) Appl. No.: 10/100,867

(22) Filed: Mar. 19, 2002

(65) Prior Publication Data

US 2003/0001893 A1 Jan. 2, 2003

Related U.S. Application Data

(60) Provisional application No. 60/278,280, filed on Mar. 23, 2001.

(51) Int. Cl.$^7$ .................................................. G06F 3/00
(52) U.S. Cl. ...................... 715/780; 715/749; 715/762; 715/505; 715/513; 707/104.1; 707/6; 719/331; 719/318
(58) Field of Search ................................ 715/780, 760, 715/762, 748, 749, 809, 843, 764, 765, 744, 513, 505, 506, 507, 503; 719/331, 332, 315, 318, 328; 707/10, 104.1, 6, 3, 103 R

(56) References Cited

U.S. PATENT DOCUMENTS

| | | | |
|---|---|---|---|
| 5,430,836 A | | 7/1995 | Wolf et al. ................. 395/155 |
| 5,438,659 A | | 8/1995 | Notess et al. .............. 395/155 |
| 5,555,365 A | | 9/1996 | Selby et al. ............... 395/159 |
| 5,619,708 A | * | 4/1997 | Ho .............................. 715/506 |
| 5,682,535 A | | 10/1997 | Knudsen .................... 395/701 |
| 5,704,029 A | * | 12/1997 | Wright, Jr. ................. 715/505 |
| 5,832,532 A | | 11/1998 | Kennedy et al. ........... 707/503 |
| 5,872,973 A | | 2/1999 | Mitchell et al. ........... 395/685 |
| 5,892,510 A | * | 4/1999 | Lau et al. ............... 715/764 X |
| 5,901,313 A | | 5/1999 | Wolf et al. ................. 395/682 |
| 5,913,029 A | | 6/1999 | Shostak ................. 395/200.33 |
| 5,937,155 A | | 8/1999 | Kennedy et al. ....... 395/183.14 |
| 5,940,075 A | | 8/1999 | Mutschler, III et al. .... 345/335 |
| 5,960,441 A | | 9/1999 | Bland et al. ............... 707/104 |
| 6,014,677 A | | 1/2000 | Hayashi et al. ........... 707/501 |
| 6,023,271 A | | 2/2000 | Quaeler-Bock et al. .... 345/335 |
| 6,122,627 A | | 9/2000 | Carey et al. ................... 707/4 |
| 6,134,540 A | | 10/2000 | Carey et al. ................... 707/2 |
| 6,138,170 A | | 10/2000 | Matheson ................... 709/318 |
| 6,192,381 B1 | * | 2/2001 | Stiegemeier et al. ....... 715/505 |
| 6,330,006 B1 | * | 12/2001 | Goodisman ................ 715/762 |
| 6,684,188 B1 | * | 1/2004 | Mitchell et al. ......... 715/809 X |

OTHER PUBLICATIONS

"Getting Information for Validating User–Entered Linked List", IBM Technical Disclosure Bulletin, vol. 37, No. 2B, Feb. 1, 1994, pp. 639–640.*

"Using Background Colors on Entry Field in a User Interface", IBM Technical Disclosure Bulletin, vol. 40, No. 3, Mar. 1, 1997, pp. 57–58.*

* cited by examiner

Primary Examiner—Raymond J. Bayerl
(74) Attorney, Agent, or Firm—Alexander J. Burke, Esq.

(57) ABSTRACT

A system for dynamically configuring a user interface display, including image elements for prompting user data entry, includes an input data processor for receiving input data via a prompt element for display in the user interface. A database associates a condition with input data received via the prompt element An image element processor determines whether the received input data satisfies the condition and at least either activates or inactivates an image element in the user interface display in response to the determination.

17 Claims, 30 Drawing Sheets

Figure 3

BINDING TABLE
13

|    | Prompt element |    | Control Type |    | Data Item Identifier |    |
|----|----------------|----|--------------|----|----------------------|----|
| 29 | ctlLastName    | 14 | InputBox     | 24 | /Person/Name/familyName | 19 |
|    | ctlFirstName   | 15 | InputBox     | 25 | /Person/Name/givenName | 20 |
| 32 | ctlDegree      | 16 | ReadOnly     | 26 | /Person/Education/highestDegree | 21 |
|    | ctlBirthDate   |    | Calendar     |    | /Patient/birthdate | |
| 30 | ctlVIP         | 17 | ComboBox     | 27 | /AllowableValues/VIPStatuses | 22 |
| 31 | ctlVIP         | 17 | ComboBox     | 28 | /Patient/VIPStatus | 23 |

Figure 4

DATA CONSTRAINTS TABLE

| EVALUATION TIME | DATA ITEM IDENTIFIER 39 | ACTION | 38 |
|---|---|---|---|
| INIT | /Patient/VIPStatus | SetAsRequired | 36 |
| INIT | /Patient/VIPStatus | setList ("1', "True", "0", "False" ) | 37 |

DATA CONSTRAINTS FOR ALTERED DATA

| EVALUATION TIME | INPUT DATA ITEM(S) PARTICIPATING IN THE CONDITION 43 | DATA ITEM IDENTIFIER 42 | CONDITION 45 | ACTION 44 |
|---|---|---|---|---|
| ON_CHANGE | /Patient/Sex | /Patient/PapTestDate | Equals(/Patient/Sex,"F") | SetAs Required |
| ON_CHANGE | /Patient/Sex | /Patient/PapTestDate | Equals(/Patient/Sex,"M") | SetAsNot Inactive |

```
1200 // ----------------------------------------------------------------
1201 // Execute a Dynamic Validation for a control
1203 // ----------------------------------------------------------------

1204 function AdaptBOHelper_controlChange (ctl)
1205 {
1206    // this function examines the data runtime for ondatachange validations for the selected control 1207    var dvElement = AdaptBOHelper_getDynamicValidationsElement ()

1208    if (dvElement == null)
1209       return true;   // nothing to check, so nothing failed 1210    var l = dvElement.childNodes.length;
1211    for (var i = 0; i < l; i++)
1212    {
1213       var thisElement = dvElement.childNodes.item(i);

1214       if (thisElement.getAttribute("RunWhen") != "ONDATACHANGE")
1215          continue;

1216       if (AdaptBOHelper_getAppliesTo(thisElement) != ctl.TntDataSource)
1217          continue;

1218       var rc = AdaptBOHelper_executeOneOnDataChange(thisElement, ctl);
1219       if (rc == false)
1220          return false;
1221    }

1222    // if this point is reached, all the validations have been passed
1223       return true;
1224 } // end function 1225 function AdaptBOHelper_executeOneOnDataChange (validationElement, ctl)
1226 {
1227    // this function executes one ondatachange dynamic validation
1228    var fn = new Function("ctl", validationElement.text);
1229    var rc = fn(ctl);
1230    return rc;
1231 } // end function
```

Figure 9

```
100 <HTML>
101 <HEAD>
102 <script defer src="HTML/SCRIPT/SubsetOfBinding.js"></script>

103 <TITLE>Patient Demographics Form</TITLE>
104 </HEAD>
105 <BODY ID=PatientDemographicsForm onload="onWindowLoad();">
106 <xml id=xmlForm></xml>

107 <SPAN TITLE="" STYLE="width:100%;" CLASS=field-label>Street:</SPAN>
108 <TEXTAREA TntTag=TextArea ID=ctlStreet TITLE="" CLASS=field TABINDEX=11 STYLE="width:100%;"
      TntReadOnly="false"></TEXTAREA>

109 <SPAN TITLE="" STYLE="width:100%;display:none;" CLASS=field-label>Address:</SPAN>
110 <TEXTAREA TntTag=TextArea ID=ctlAddress TITLE="" CLASS=field TABINDEX=12
      STYLE="width:100%;display:none;"TntReadOnly="false"></TEXTAREA>

111 <SPAN TITLE="" STYLE="width:100%;" CLASS=field-label>Zip code:</SPAN>
112 <INPUT TntTag=InputBox ID=ctlZipCode TYPE=textbox onafterchange="ctlZipCode_onafterchange(this);"
      onchange="ctlZipCode_onchange(this);"></INPUT>

113 <SPAN TITLE="" STYLE="width:45 %;" CLASS=field-label>State:</SPAN>
114 <SELECT TntTag=DataListBox ID=ctlState TntDataTarget="/Patient/stateCode"
      OptionValueDataSrc="stateCode" OptionTextDataSrc="stateCode/description"
      SelectElementByOID="true"></SELECT>

115 <SPAN ID=label_ctlCity TITLE="" STYLE="width:100%;" CLASS=field-label>City:</SPAN>
116 <INPUT TntTag=InputBox ID=ctlCity TYPE=textbox TITLE="" CLASS=field TABINDEX=14
      STYLE="width:100%;" TntReadOnly="false"></INPUT>

117 </BODY>
118 <SCRIPT>
119 // ------------------ Global Variables ------------
120 // Global Control Binding Reference Table
121 var g_ControlReferenceTable = new Array();
122 g_ControlReferenceTable["ctlStreet"] = new
      Array("TextArea","/Patient/currentAddress","/Patient/currentAddress/streetAddressText",11,ctlStreet);
123 g_ControlReferenceTable["ctlAddress"] = new
      Array("TextArea","/Patient/currentAddress","/Patient/currentAddress/streetAddressText",11,ctlAddress);
124 g_ControlReferenceTable["ctlZipCode"] = new
      Array("InputBox","/Patient/currentAddress","/Patient/currentAddress/zipCode",12,ctlZipCode);
125 g_ControlReferenceTable["ctlState"] = new
      Array("DataComboBox","/Patient/currentAddress","/Patient/currentAddress/stateCode/description",12,ctlSta
      te);
126 g_ControlReferenceTable["ctlCity"] = new
      Array("InputBox","/Patient/currentAddress","/Patient/currentAddress/cityName",11,ctlCity);
```

Figure 10A

```
127 // ------------------- Window event handlers -------------
128 function onWindowLoad()
129 {

130 // get the XML data stream from a server
131 xmlIn = getXMLFromServer();

132 // load the XML into the xml document (tag) with ID=xmlForm
133 xmlForm.loadXML (xmlIn);

134    // bind the UI controls with the XML data - function in SmsTntBinding.js (figure 12)
135    moveXmlForAll();
136 }

137 // ------------------- Control event handlers -------------

138 function ctlStreet.onchange()
139 {
140 // INITIAL
141 var control = window.event.srcElement;

142 // DYNAMIC CONSTRAINTS - if fails abort bind
143 if(!AdaptBOHelper_controlChange(control))
144    return;

145 // BIND
146 TextArea_UI_TO_XML (control);
147 }
```

Fig. 10B

```
148 function ctlAddress.onchange()
149 {
150 // INITIAL
151 var control = window.event.srcElement;

152 // BIND
    TextArea_UI_TO_XML (control);
153 }

154 function ctlZipCode.onchange()
155 {
156 // INITIAL
157 var control = window.event.srcElement;

158 // DYNAMIC CONSTRAINTS - if fails abort bind
159 if(!AdaptBOHelper_controlChange(control))
160     return;

161 // BIND
162 InputBox_UI_TO_XML (control);

163 ctlZipCode_onafterchange(control);
164 }

165 function ctlZipCode_onafterchange (control)
166 {

167 // CUSTOM - Custom User Script executes after binding occurs
168 // Call application server to lookup City from ZipCode with
169 // LoadXMLWithCityFromZip function (not illustrated)
170 inputXMLLocation = "/Patient/currentAddress/zipCode";
171 outputXMLLocation = "/Patient/currentAddress/City";
172 LoadXMLWithCityFromZip(getValue(inputXMLLocation),outputXMLLocation);

173 // PARTIAL REBIND
174 affectedControls = UiBinding_GetControlsBoundToNodePath(outputXMLLocation);
175 for (var j=0; j<affectedControls.length; j++)
176     UiBinding_moveXMLDataToUi(affectedControls[j]);
177 }
```

Fig. 10C

```
178 function ctlCity.onchange()
179 {
180  // INITIAL
181  var control = window.event.srcElement;

182  // CUSTOM - do custom validations here
183  if passMyValidation(control) == false
184      return;  //abort buffer updating (bind)

185  // DYNAMIC CONSTRAINTS - if fails abort bind
186  if(!AdaptBOHelper_controlChange(control))
187      return;

188  // BIND
189  InputBox_UI_TO_XML (control);
190 }

191 </SCRIPT>
192</HTML>
```

Figure 10D

```
200 -<serialization>
201 -<DynamicValidations>
202   -<Validation AppliesTo="/Patient/currentAddress/zipCode"
203   RunWhen="ONINIT">
204      <![CDATA[setFieldRequired(nodePath);]]>
205   </Validation>
206   -<Validation AppliesTo="/Patient/activeIdentifiers/element/identifierType"
207   RunWhen="ONINIT">
208      <![CDATA[setListElements(nodePath, '<SmsTntCodedValue
209            ClassName="com.sms.tnt.allowablevalues.SmsTntCodedValue"                2102
        OID="System.en_US.16.0"><description></description><crossRefCode></crossRefCode><behaviorCo
        de>0</behaviorCode><mnemonic></mnemonic></SmsTntCodedValue>', '', '<SmsTntCodedValue
        ClassName="com.sms.tnt.allowablevalues.SmsTntCodedValue"
        OID="SmsDef.Tnt.AllowableValues.en_US.16.13"><description>Donor
        Registration</description><crossRefCode>null</crossRefCode><behaviorCode>13</behaviorCode><m
        nemonic>DR</mnemonic></SmsTntCodedValue>', 'Donor Registration', '<SmsTntCodedValue
        ClassName="com.sms.tnt.allowablevalues.SmsTntCodedValue"
        OID="SmsDef.Tnt.AllowableValues.en_US.16.2"><description>Drivers
        License</description><crossRefCode>null</crossRefCode><behaviorCode>2</behaviorCode><mnemo
        nic>DL</mnemonic></SmsTntCodedValue>', 'Drivers License', '<SmsTntCodedValue
        ClassName="com.sms.tnt.allowablevalues.SmsTntCodedValue"
        OID="SmsDef.Tnt.AllowableValues.en_US.16.5"><description>Medical Record
        Number</description><crossRefCode>null</crossRefCode><behaviorCode>5</behaviorCode><mnemo
        nic>MR</mnemonic></SmsTntCodedValue>', 'Medical Record Number', '<SmsTntCodedValue
        ClassName="com.sms.tnt.allowablevalues.SmsTntCodedValue"
        OID="SmsDef.Tnt.AllowableValues.en_US.16.28"><description>National Person
        ID</description><crossRefCode>null</crossRefCode><behaviorCode>28</behaviorCode><mnemonic>
        NN</mnemonic></SmsTntCodedValue>', 'National Person ID', '<SmsTntCodedValue
        ClassName="com.sms.tnt.allowablevalues.SmsTntCodedValue"
        OID="SmsDef.Tnt.AllowableValues.en_US.16.15"><description>National Unique Individual
        ID</description><crossRefCode>null</crossRefCode><behaviorCode>15</behaviorCode><mnemonic>
        NI</mnemonic></SmsTntCodedValue>', 'National Unique Individual ID', '<SmsTntCodedValue
210     ClassName="com.sms.tnt.allowablevalues.SmsTntCodedValue"
```

Figure 11A

211 OID="SmsDef.Tnt.AllowableValues.en_US.16.14"><description>Person
    Number</description><crossRefCode>null</crossRefCode><behaviorCode>14</behaviorCode><mnem
    onic>PN</mnemonic></SmsTntCodedValue>',    "Person Number", '<SmsTntCodedValue
        ClassName="com.sms.tnt.allowablevalues.SmsTntCodedValue"
    OID="SmsDef.Tnt.AllowableValues.en_US.16.16"><description>Railroad Retirement
    Number</description><crossRefCode>null</crossRefCode><behaviorCode>16</behaviorCod
    e><mnemonic>RR</mnemonic></SmsTntCodedValue>',    "Railroad Retirement Number",
    '<SmsTntCodedValue
        ClassName="com.sms.tnt.allowablevalues.SmsTntCodedValue"
    OID="SmsDef.Tnt.AllowableValues.en_US.16.10"><description>Social Security
    Number</description><crossRefCode>null</crossRefCode><behaviorCode>10</behaviorCod
    e><mnemonic>SS</mnemonic></SmsTntCodedValue>',    "Social Security Number",
    '<SmsTntCodedValue
        ClassName="com.sms.tnt.allowablevalues.SmsTntCodedValue"
    OID="SmsDef.Tnt.AllowableValues.en_US.16.17"><description>WIC
    Number</description><crossRefCode>null</crossRefCode><behaviorCode>17</behaviorCod
    e><mnemonic>WC</mnemonic></SmsTntCodedValue>    ', "WIC Number");]]>
212     </Validation>
213     </DynamicValidations>
214 -<Patient ClassName="com.core.ptmgmt.SmsTtnPatient"
215     OID="44946832753169" SmsTntObjectDirtyFlag="Update">
216   -<currentAddress ClassName="com.admin.SmsTtnPersonAddressUsage"
217     OID="935504006611766" SmsTntObjectDirtyFlag="Query">
218     <cityName>Malvern</cityName>
219     <countryName>USA</countryName>
220     <streetAddressText>1227 AnyStreet Dr.</streetAddressText>
222     <zipCode>19355</zipCode>
223   </currentAddress>
224 </Patient>
225 </serialization>

Figure 11B

```
300 // --------------------------------------------------------
301 // Bind XML to all the controls
302 // --------------------------------------------------------

303 function moveXmlForAll()
304 {

305     // Call bind on every element in the g_ControlReferenceTable array,
306     // assuming that UI Generator included all elements that are to be bound.

307     for (x in g_ControlReferenceTable)
308     {
309         moveXmlForControl (g_ControlReferenceTable[x][4]);
310     }
311 }
```

Figure 12

```
312 // --------------------------------------------------------
313 // Bind XML to one control
314 // --------------------------------------------------------
315 function moveXmlForControl (ctl)
316 {
317     var controlTntTag = g_ControlReferenceTable[ctl.id][0];
318     // for performance reasons explicitly call the functions for each of the control types
319     if ( controlTntTag == "InputBox" )
320         InputBox_XML_TO_UI(ctl);          //see function declared below
321     else if ( controlTntTag == "DataComboBox" )
322         DataComboBox_XML_TO_UI(ctl);      //see function declared below
323     else if ( controlTntTag == "ReadOnly" )
324         ReadOnly_XML_TO_UI(ctl);
325     else if ( controlTntTag == "TextArea" )
326         TextArea_XML_TO_UI(ctl);
327     else if ( controlTntTag == "Grid" )
328         Grid_XML_TO_UI(ctl);

329             //... more control types go here - removed for brevity

330     // Set the label text color for the control based on whether the control is disabled
331     // or not. The label is assumed to have the same name as the control but with a "label_"
332     // prefix.
333     var lbl = "document.all.label_" + ctl.id;
334     var aTemp = document.all("label_" + ctl.id);
```

Figure 13A

```
335  if (typeof(ctl.tagName) != "undefined")
336  {
337      var bDisabled = false;
338      var bTntDisabled = false;

339      if (typeof(ctl.disabled) != "undefined")
340              bDisabled = ctl.disabled;

341      if (typeof(ctl.TntDisabled) != "undefined")
342              //Note - controls generally set TntDisabled to "true" and "false"
343              // but the combo box is sets this to "YES". The combo box will be changed
344              // to work like the other controls but that's why the following condition
345              // makes a comparison to "YES" for now.
346              if (ctl.TntDisabled == "true" || ctl.TntDisabled == "YES")
347                      bTntDisabled = true;
348              else
349                      bTntDisabled = false;

350      if (bDisabled||bTntDisabled)       // ctl.TntDisabled is only defined for ComboBox.
351                      //As IPS ComboBox is inside of <SPAN>. <SPAN> does
352                      //not support 354"disabled" as its attibute. cxwang
353          {
354                  __TntCommon_DisableControl(ctl, true);
355          } // end if
356          else
357          {
358                  __TntCommon_DisableControl(ctl, false);
359          } // end else 360  } // end outer if
361  } // end function
```

Figure 13B

```
400 // ------------------------------------------------------------
401 // EXAMPLE OF BINDING ROUTINES FOR A CONTROL -INPUTBOX
402 // ------------------------------------------------------------

403 function InputBox_XML_TO_UI (ctl)
404 {
405   keyId = ctl.id;
406   var TntRelDataSource = getRelativeDataSource (keyId);
407   var TntAbsDataSource = getAbsoluteDataSource (keyId);

408   ctl.value = "";

409   if (TntRelDataSource != "")
410           ctl.value = s;
411   }
412 }

413 function InputBox_UI_TO_XML (ctl)
414 {
415   keyId = ctl.id;
416   var TntRelDataSource = getRelativeDataSource (keyId);
417   var TntAbsDataSource = getAbsoluteDataSource (keyId);

418   var value = TrimVal(ctl.value);

419   if (TntRelDataSource != "")
420       setValue(TntAbsDataSource, value);

```
500 // ----------------------------------------------------------------------
501 // EXAMPLE OF BINDING ROUTINES FOR A CONTROL -DATALIST/DATACOMBOBOX
502 // ----------------------------------------------------------------------

503 function DataComboBox_XML_TO_UI(ctl)
504 {

505   // if control is in grid don't bind it because the grid will take care of this
506   if ( ctl.isInGrid == "true" )
507       return;

508   keyId = ctl.id;
509   var TntRelDataSource = getRelativeDataSource (keyId);
510   var TntStartDataSource = getStartDataSource (keyId);
511   var TntAbsDataSource = getAbsoluteDataSource (keyId);

512   var StartDataRef = null;
513   var s = "";

514   // clear the listbox (assign the length to a variable because it doesn't work inline)
515       var limit = ctl.options.length;

516   for (var j = 0; j < limit; j++)
517       // always remove the topmost element (i.e., element 0) since the collection is contracting
518       ctl.options.remove(0);

519   nodeElem = xmlForm.documentElement.selectSingleNode (TntAbsDataSource);
520   if (!nodeElem) //No data
521       return;
522
523
```

Figure 15A

```
524  // if optionValueDataSrc was specified, build an XQL string for element 0 and
525  // then try to get a reference to that node to be used as a flag (later in this routine).
526  var valueNode = xmlForm.documentElement.selectSingleNode(TntAbsDataSource + "[0]/" +
     ctl.OptionValueDataSrc);
527  var isValidValueDataSource = (valueNode != null);

528  // Define DataSource for the Table control
529  var dataSource = TntAbsDataSource.slice(0, TntAbsDataSource.lastIndexOf("/"));

530   // find the source list
531  nodeList = xmlForm.documentElement.selectSingleNode (dataSource);

532  // get number of records in the List Recordset
533  var listCount = nodeList.childNodes.length;

534  if (listCount == 0)
535     return;

536  var nodeRecord = nodeList.childNodes(0);

537  //Check for the special case that the list is just one empty (placeholder) item
538  if (listCount == 1 && nodeRecord.getAttribute ("IsPlaceHolder") != null)
539  {
540     //if AddNullElement option make it's value a nullObject Placeholder
541     if (typeof(ctl.AddNullElement) != "undefined")
542     {
543            if (!ctl.OptionValueDataSrc)   //if value is entire list element
544                   nodeField = nodeRecord;
545            else                                                    //else an object within the element
546                   nodeField = nodeRecord.selectSingleNode (ctl.OptionValueDataSrc);
547            nodeField.setAttribute ("IsNullObject", "1");
548            nodeField.setAttribute ("IsPlaceHolder", "1");
549     }
550     return;
551  }
```

Figure 15B

```
552   else      //if AddNullElement option and a NullObject element does not already exist
553             //add a nullObject Placeholder element by cloning the 1st element
554   if    (         typeof(ctl.AddNullElement) != "undefined" &&
555                   (nodeList.selectSingleNode("element[@IsNullObject]") == null)
556         )
557   {
558             xmlGraft = new ActiveXObject ("Microsoft.XMLDOM");
559             xmlGraft.async = false;

560             xmlGraft.loadXML (nodeRecord.xml);
561             var elem = xmlGraft.documentElement;

562             //make desc blank
563             if (!ctl.OptionTextDataSrc)           //if a string (non-object)
564                     nodeField = elem;
565             else
566                     nodeField = elem.selectSingleNode (ctl.OptionTextDataSrc);
567             nodeField.text ="";

568             //set value to nullObject Placeholder
569             if (!ctl.OptionValueDataSrc)   //if value is entire list element
570                     nodeField = elem;
571             else                                                    //else an object within the element
572                     nodeField = elem.selectSingleNode (ctl.OptionValueDataSrc);
573             nodeField.setAttribute ("IsNullObject", "1");
574             nodeField.setAttribute ("IsPlaceHolder", "1");
575             nodeField.removeAttribute ("OID");

576             nodeList.insertBefore(nodeField, nodeRecord);

577             xmlGraft = null;
578             listCount++;
579   }
```

Figure 15C

```
580  // loop through the XML document and add each element to the listbox
581  for (var i = 0; i < listCount; i++)
582  {
583      // get List Record
584      var nodeRecord = nodeList.childNodes(i);
585      var nodeField;

586      //get Field node
587      if (!ctl.OptionTextDataSrc)        //This allows binding to just a string (non-object)
588              nodeField = nodeRecord;
589      else
590              nodeField = nodeRecord.selectSingleNode (ctl.OptionTextDataSrc);

591      if (!nodeField)
592      {
593              ctl.disabled = true;
594              return;
595      }

596      if (nodeField.nodeType == NODE_TEXT)
597              var desc = nodeField.nodeValue;
598      else
599              var desc = nodeField.text;

600      if (isValidValueDataSource)        //if the Value Data Source is valid XQL   and it finds an element 601              var value = TntAbsDataSource + "[" + i + "]" + "/" + ctl.OptionValueDataSrc;
602      else    //just assume the entire element should be put in the list
603              var value = TntAbsDataSource + "[" + i + "]";
```

Figure 15D

```
604   // add each description to the listbox, programmatically
605   oOption = document.createElement("OPTION");
606   oOption.text = desc;
607   oOption.value = value;

608   ctl.add(oOption);
609 }

610 ctl.selectedIndex = -1;

611 //copy the list item to the TargetData attribute if it is defined and the element exists in the XML
612 if (typeof(ctl.TntDataTarget) != "undefined")
613 {
614     var TntDataTarget = ctl.TntDataTarget;
615     var absDataTarget = "";          //Absoulute data source used for XSL pattern query 616     if (ctl.TntDataTarget.slice(0,1) == "/")
617             absDataTarget = "." + ctl.TntDataTarget;
618     else
619             absDataTarget = "." + TntStartDataSource + "/" + TntDataTarget;

620     var matchOnOID = false; //flag which means to find and highlight DataTarget in list using OID
621     var node = xmlForm.documentElement.selectSingleNode (absDataTarget);
622     if (node != null)
623     {
624     //if data target is an object then assume it contains the same element as the list description data source
625         if (node.attributes.getNamedItem ("ClassName") != null)
626         {
627                 //look for the target object by searching for its OID in the list?
628                 if (typeof(ctl.SelectElementByOID) != "undefined")
629                 {
630                         if (ctl.SelectElementByOID == "true")
631                                 matchOnOID = true;
632                 }
633                 else
634                         matchOnOID = false;
```

Figure 15E

```
635              if (!matchOnOID)  //if not matching on OID assume it contains the same element as the
      list description data source
636              {
637                      //if we are using a valid Value Data Source      (this is an offset into repeating
      element)
638                      //so drop it off the front of the Value Source
639                      if (isValidValueDataSource)
640                              var ds = absDataTarget +
      (ctl.OptionTextDataSrc).substring((ctl.OptionValueDataSrc).length);
641                      else
642                              var ds = absDataTarget + "/" + ctl.OptionTextDataSrc;
643                      s = xmlForm.documentElement.selectSingleNode(ds).text;
644              }
645      }
646      else
647              s = node.text;
648  }

649  if (matchOnOID)
650  {
651      // find the object ID in the list - unless the object has no OID (placeholder today has no OID)

652      theTargetOID = node.getAttribute("OID");
653      if (theTargetOID != null)
654              for (var y = 0; y < ctl.length; y++)
655              {
                          e = xmlForm.documentElement.selectSingleNode(ctl.item(y).value);
656                      if (e.getAttribute("OID") == theTargetOID)      //compare to target OID
657                      {
658                              ctl.selectedIndex = y;
659                              break;
660                      }
661              }
662  }
663  else if (s != "")   //if there is a data target value
664  {
```

Figure 15F

```
665         // find option in the list
666         for (var y = 0; y < ctl.length; y++)
667         {
668                 if (ctl.item(y).text == s)   //compare to description
669                 {
670                         ctl.selectedIndex = y;
671                         break;
672                 }
673         }
674     }
675 }

676 if (typeof(ctl.AlwaysOneSelected) != "undefined")
677 {
678     if (ctl.selectedIndex == -1)        //if none selected already then select first one
679     {
680         if (!g_AlwaysOneSelectedInProcess) //this will stop endless recursive loop if no match ever
        found
681         {
682                 ctl.selectedIndex = 0;
683                 g_AlwaysOneSelectedInProcess = true;
684                 eval(ctl.id + "_onchange(ctl);");
685                 g_AlwaysOneSelectedInProcess = false;
686         }
687     }
688 }

689 ListBox_InitialReadOnly(ctl);
690 }

691 function DataComboBox_UI_TO_XML (ctl)
692 {
693 keyId = ctl.id;
694 var TntRelDataSource = getRelativeDataSource (keyId);
695 var TntStartDataSource = getStartDataSource (keyId);
696 var TntAbsDataSource = getAbsoluteDataSource (keyId);
697 var absDataTarget = "";
698 var TntDataTarget = ctl.TntDataTarget;
```

Figure 15G

```
699  if (ctl.selectedIndex >= 0)
670  {
671      var listElementDataSource = TrimVal(ctl.item(ctl.selectedIndex).value);
672      var node = xmlForm.documentElement.selectSingleNode (listElementDataSource);

673      if ((typeof(TntDataTarget) != "undefined") && (node))
674      {
675          if (TntDataTarget.slice(0,1) != "/")
676              absDataTarget = "." + TntStartDataSource + "/" + TntDataTarget;
678          else
679              absDataTarget = "." + TntDataTarget;

680          var targetNode = xmlForm.documentElement.selectSingleNode (absDataTarget);
681          var txt = node.text;
682          var xml = node.xml;

683          var attrClass = targetNode.attributes.getNamedItem ("ClassName");

684          if (attrClass) //If it is a class, graft it.
685              graftXML (absDataTarget, xml);
686          else //If it is an attribute, set it.
687              setValue (absDataTarget, txt);
688      }
689  }
690  }
```

Figure 15H

```
700 // --------------------------------------------------------
701 // Given a relative XQL reference and a start element, sets the specified value
702 // into the XML element that the XQL resolves to.
703 // @param  startNode (optional)   the starting Element
704 // @param  xql       the xql reference
705 // @param  value     the value to set into the Element
706 // --------------------------------------------------------
707 function setValue (startNode, xql, value)
708 {

709   //If startNode is not passed in
710   if (arguments.length == 2)
711   {
712      value = arguments[1];
713      xql = arguments[0];
714      startNode = xmlForm.documentElement;
715   }

716   var e = startNode.selectSingleNode (xql);

717   if (e)
718   {
719      setAndDirty(e, value);
720      syncElementsBoundToSameInstanceAndProperty(e);
721   }
722 }
```

Figure 16

```
800 // --------------------------------------------------------
801 // Highlight a required field control
802 // --------------------------------------------------------

803 function setFieldRequired (nodePath)
804 {
805    // this function sets any controls bound to the specified XML element to be required 806    var boundControls = new Array();
807    boundControls = UiBinding_GetControlsBoundToNodePath(nodePath);

808    for (var i = 0; i < boundControls.length; i++)
809    {
810       if ((boundControls[i].TntTag != "ReadOnly")
811              && (boundControls[i].TntTag != "Grid"))
812             TntCommon_SetRequired(boundControls[i]);
813    }
814 }
```

Figure 17

```
900 // -----------------------------------------------------------
901 // Determine which controls are pointing to a specific branch in the XML
902 // -----------------------------------------------------------
903 function UiBinding_GetControlsBoundToNodePath (nodePath)
904 {
905     // this function walks the document.all collection, looking for elements with a
906     // TntDataSource property (or DataTarget in case of the DataList)
907     // equal to the passed-in XQL reference. Such controls are
908     // added to an array that is ultimately returned to the user.

909     var fullDataSource = "";
910     var a = new Array();
911     var nodePathWithDelim = nodePath + "/";
912     var dataSource;
913     var dataTarget;
914     var nonCodedValueObject = false;

915 // determine if the nodePath refers to an object that is not the special coded value object
916 var node = getElementIfExists(nodePath);
917     if (node)
918     {
919             nodeClass = node.attributes.getNamedItem ("ClassName");
920             if (nodeClass)
921                     if (nodeClass.value.indexOf("CodedValue") == 0)
923                             nonCodedValueObject = true;
924     }
925 for (x in g_ControlReferenceTable)
926 {
927         dataSource = getAbsoluteDataSource(x) + "/";
928         dataTarget = "";
```

Figure 18A

```
929    // for the DataListBox and DataComboBox also use the data target
930    if (g_ControlReferenceTable[x][0] == "DataListBox" || g_ControlReferenceTable[x][0] == "DataComboBox")
931    {
932            dataTarget = g_ControlReferenceTable[x][4].TntDataTarget;
933            if (typeof(dataTarget) == "undefined")
934                    dataTarget = "";
935            else
936                    dataTarget = "." + dataTarget + "/";
937    }

938    // if nodePath is an non-code value object then match exactly - not just left most part of datasource
939    if (!nonCodedValueObject)
940    {
941            // skip over the initial dot
942            dataSource = dataSource.substr(1, nodePathWithDelim.length);
943            dataTarget = dataTarget.substr(1, nodePathWithDelim.length);
944    }

945    if (nodePathWithDelim == dataSource || nodePathWithDelim == dataTarget)
           {
946        a[a.length] = g_ControlReferenceTable[x][4];
947        //jdh 5/23 allow it to find all controls - break;
948      }
949 }

950   return a;
951 }
```

Figure 18B

```
1000 // ----------------------------------------
1001 // Control highlighting
1002 // ----------------------------------------

1003 function TntCommon_SetRequired (ctl, setToRequired, isConditional)
1004 {

1005     var bSetToRequired;
1006     var bIsConditional;

1007     var ctlClassName;
1008     var ctlLabelClassName;

1009     // no control passed in? adios...
1010     if (typeof(ctl) == "undefined")
1011         return;

1012     // Can't set Grid and Readonly to "required"
1013     if ((ctl.TntTag == "ReadOnly") || (ctl.TntTag == "Grid"))
            return;

1014     // the setToRequired variable is optional so set
1015     // another variable that will be used further down.
1016     if (typeof(setToRequired) == "undefined")
            bSetToRequired = true;
1017     else
            bSetToRequired = setToRequired;

1018     // do the same with the isConditional parameter
1019     if (typeof(isConditional) == "undefined")
1020         bIsConditional = false;
1021     else
1022         bIsConditional = isConditional;
```

Figure 19A

```
1023   // set the class name variables based on whether
1024   // the control's appearance should be set to "required" or
1025   // "non-required".

1026   if (bSetToRequired)
1027   {
1028   ctlClassName = "required-field";
1029   ctlLabelClassName = "required-field-label";
1030   }
1031   else
1032   {
1033           ctlClassName = "field";
1034           ctlLabelClassName = "field-label";
1035   }

1036   // do the control
1037   if (ctl.TntObject == null)
1038   {
1039   ctl.className = ctlClassName;
1040
1041
1042   }
1043   else
1044   {
1045   ctl.TntObject.setRequired(bSetToRequired);
1046   }

1047   // do the label if it exists
1048   theLabel = document.all("label_" + ctl.id);
1049   if (theLabel != null)
1050   {
1051   theLabel.className = ctlLabelClassName;
1052   theLabel = null;
1053   }

1054// don't do anything with the associated label if the caller
1055// specified that this is conditionally required
1056   if (bIsConditional)
1057   return;

1058   _setAssociatedLabelClass(ctl, ctlLabelClassName);
1059 }
```

Figure 19B

```
1100 //----------------------------------------------------------------
1101 // Highlight the label for a required control
1102 //----------------------------------------------------------------

1103 function __setAssociatedLabelClass(ctl, ctlLabelClassName)
1104 {
1105     var aLabel = ctl.getAttribute(ASSOCIATED_LABEL);
1106     if(aLabel != null)
1107     {
1108             var objLabel = document.all(aLabel);

1109             if(objLabel != null)
1110     {
1111             objLabel.className = ctlLabelClassName;
1112             objLabel = null;
1113     }

1114     aLabel = null;
1115 }
1116 }
```

Figure 20

SYSTEM FOR DYNAMICALLY CONFIGURING A USER INTERFACE DISPLAY

This application is a non-provisional application claiming priority from previously filed provisional application Ser. No. 60/278,280 filed Mar. 23, 2001.

FIELD OF THE INVENTION

This invention pertains generally to a computer user interface display configuration and processing system, and more specifically to a nonprocedural method for interfacing a data buffer to event driven user interface controls.

BACKGROUND OF THE INVENTION

Forms displayed on internet browsers via the World Wide Web are typically defined by the use of Hypertext Markup Language (HTML) or Dynamic Hypertext Markup Language (DHTML). DHTML is a product of the Microsoft Corporation of Redmond, Wash. DHTML incorporates the concept of the Form as a means of presenting Graphical User Interface (GUI) controls for manipulation by the user. DHTML documents are textual documents which contain tags representing such controls. Graphically, these controls are image elements which display data, possibly along with a caption identifying the data, for the user, and prompt the user to manipulate the displayed data, if desired. These prompt elements allow a user to view, add, replace or edit data, and may also contain initial data supplied by the server when the form is initially sent from the server to the web browser. An example of a DHTML tag specifying an input-box control with initial data "19344" might be written as:

<INPUT ID=ctlZipCode>19344</INPUT>

When the user is finished entering data, the form is submitted back to the server. When a DHTML form is submitted to a server, the contents of all of the prompt elements are collected by the Web browser and forwarded as part of the Universal Resource Locator (URL) to the Web server in the form of control name/control value pairs.

In some applications, external data from an external database is sent from the server to the client to be manipulated by the user via the prompt elements in the form. Specific portions of the external data are displayed on the form in corresponding prompt elements. The user then manipulates the data in the prompt elements. The newly added, or edited data is then sent back to the server which updates the external database in response. In such an application, the external data must be associated with prompt elements on the form.

Data binding refers to a software subroutine which associates data from the external database with the prompt elements for manipulating the data within the form. The architecture of the existing state of the data binding art, as suggested by Microsoft, is depicted in FIG. 1. This known data binding mechanism relies on an architecture having four components, namely a data source object (DSO), data consumers, a binding agent and a table repetition agent. In order to bind data to prompt elements present on an HTML page, a DSO must exist on that page. The DSO may require an Open Database Connectivity (OBDC) string and/or a Structured Query Language (SQL) statement or only a Universal Resource Locator (URL). SQL is discussed in *SQL—The Complete Reference* by James R. Groff and Paul N. Weinberg, McGraw-Hill Professional Publishing (1999) ISBN 007-211-8458.

The DSO may also be defined in terms of the Extensible Markup Language (XML). XML is discussed in *Essential XML: Beyond Markup* by Don Box, Aaron Skonnard and John Lam, Addison-Wesley Publishing Co. (2000) ISBN 020-170-9147. An XML document may define a hierarchical data structure and contain the data thus defined. In order to use an XML document one must add a Java applet element, defining the operation of the DSO, to the HTML page. Java is a product of Sun Microsystems, Inc of Palo Alto, Calif. The Java applet conditions the client computer to retrieve an XML document containing the external data, parse the data, and provide specified data to the bound prompt elements on the page. In this manner, the data consuming prompt elements are isolated from the details of data in the XML document.

The Microsoft DHTML data binding software utilizes the Microsoft ActiveX Data Object (ADO) programming model which is discussed in *Understanding ActiveX and OLE* by David Chappell, published by the Microsoft Press, Redmond, Wash., ISBN 1-572-31216-5. The ADO programming model is a recordset model. The ADO recordset contains two components, namely a collection of Fields and a collection of Properties. Each record within an ADO recordset has a collection of Fields. The Fields collection is the default collection for an ADO recordset object. Each Field has a Name, Value and Count property. The Count property indicates the number of Fields in the collection. In the ADO recordset Properties collection each property has a Name, Type and Value.

The ADO programming model permits only serial addressing of a record set, that is, only one record set at a time is accessible to the DSO. One result of using the ADO protocol is that there is no practical method of binding a group of prompt elements, i.e. one form, to more than one record set object at a time.

In the context of forms, a group of prompt elements is a tabular grouping of prompt elements that may be aligned either vertically and/or horizontally. Each prompt element prompts a user to either make a selection or enter data. In some applications, for example for manipulation of hierarchically related data, it may be desired for data for presentation in a grouping of prompt elements on a form to come from several underlying record set objects. However, the Microsoft ADO record set model does not integrate well with an object oriented hierarchical data buffer structure in which it is desired to display data from multiple record sets together. To use the Microsoft ADO record set model in such a manner, an HTML document author must write separate DSO code objects to manipulate multiple record sets in order to bind the desired data to corresponding prompt elements in the form.

When a DHTML document is sent by a server to a client machine the document may already have embedded data. The client's web browser subsequently receives and displays whatever data is already contained in the server generated document. When a DHTML form has some of its data altered by the client user, the form is returned to the server in its entirety, that is, both the data and the underlying form is retransmitted to the server. The repeated sending of redundant information regarding a largely static form creates unnecessary network traffic.

Numerous examples of data binding protocols exist. U.S. Pat. No. 6,014,677, entitled DOCUMENT MANAGEMENT DEVICE AND METHOD FOR MANAGING DOCUMENTS BY UTILIZING ADDITIVE INFORMATION, issued to Hayashi et al. discloses a binding information creating device which associates a document with subsequent evaluation data based on earlier information contained within the document. A tag template is defined by an onscreen editor, and a tag template database is created to associate coinciding tags with the same document.

U.S. Pat. No 5,940,075, entitled METHOD FOR EXTENDING THE HYPERTEXT MARKUP LANGUAGE (HTML) TO SUPPORT ENTERPRISE APPLICATION DATA BINDING, issued to Mutschler, III et al. discloses a web server program and associated database for storing description language of a form to be displayed. The server is coupled to a host having a CPU executing a legacy application containing the form. The server opens the form and associates data names with data values received from the host and sends them to the client.

U.S. Pat. No. 6,023,271, entitled FRAMEWORK FOR BINDING DATA VIEWERS/DATA MANIPULATION WITH ONE TO MANY OBJECTS THROUGH INTROSPECTION, issued to Quaeler-Bock et al., discloses a data structure that enables a client application to bind a set of GUI components to the attributes of at least one Business Object (BO).

U.S. Pat. No. 5,555,365, entitled METHOD AND SYSTEM FOR OPTIMIZING STATIC AND DYNAMIC BINDING OF PRESENTATION OBJECTS WITH THE OBJECT DATA THEY REPRESENT, issued to Selby et al. discloses the creation of a table that specifies relationships between GUI objects and the application object. Each time the application object is initialized the table is used to specify objects within the application object.

U.S. Pat. No. 5,430,836, entitled APPLICATION CONTROL MODEL FOR COMMON USER INTERFACE ACCESS, issued to Wolf et al., discloses an Application Control Module (ACM) that is executable by the applications. The ACM includes functional elements for initializing the data in the application, drawing or presenting a display screen defined by the data, running or processing user input events in accordance with the operation defined by the data, and closing the application.

U.S. Pat. No. 5,832,532, entitled MODEL INDEPENDENT AND INTERACTIVE REPORT GENERATION SYSTEM AND METHOD OF OPERATION, issued to Kennedy et al. discloses an interactive report generation system that includes a compiler, an evaluator, a renderer, and model interface functions. The compiler receives report, layout, and worksheet definitions, accesses model interface functions, and generates a report template. The evaluator receives the report template, accesses model interface functions, accesses a user model, and generates a report instance. A renderer receives the report instance in order to display and allow interaction with that report instance.

Another problem which is present when processing data from an external database is that some of the data have values which are subject to a constraint. Further, some of the data have values which are subject to a constraint which depends on the values of other data. In addition, the status of some data may be changed based on the value of other data. For example, a piece of data may become required if a second piece of data has a first value and unnecessary or irrelevant if that second piece of data has a second value. A binding mechanism is desirable which, in addition to linking data items from the external database to prompt elements in the form, will dynamically configure all of the prompt elements on the form based on the values entered into each prompt element and which will enforce the data constraints described above and ensure that the data returned to the external database remains internally consistent.

BRIEF SUMMARY OF THE INVENTION

In accordance with principles of the present invention, a system for dynamically configuring a user interface display, including image elements for prompting user data entry, includes an input data processor for receiving input data via a prompt element for display in the user interface. A database associates a condition with input data received via the prompt element An image element processor determines whether the received input data satisfies the condition and at least either activates or inactivates an image element in the user interface display in response to the determination.

BRIEF DESCRIPTION OF THE DRAWING

In the drawing:

FIG. 3 is a pictorial representation of an exemplary form useful in understanding the operation of the present invention;

FIG. 4 is an example of a binding database table created according to the principles the present invention;

FIG. 6 is an example of a table depicting a first group of data constraints associated with a form according to the principles of the present invention;

FIG. 7 is an example of a table depicting a second group of data constraints associated with a form according to the principles of the present invention;

FIG. 9 is a JavaScript code listing that performs a dynamic validation of an image element;

FIGS. 10A, 10B, 10C and 10D, taken together, depict a sequential HTML code listing depicting the display of and processing of data in portions of the form depicted in FIG. 3;

FIGS. 11A and 11B, taken together, depict a sequential XML code listing that creates an XML document that is embedded in the HTML form depicted in FIG. 3;

FIG. 12 is a JavaScript code listing that will bind XML data items received from a server machine to specified controls appearing in the form depicted in FIG. 3 according to data description in the XML document of FIG. 11;

FIGS. 13A and 13B, taken together, depict a sequential JavaScript code listing that will bind an XML data item received from a server machine to one specified control appearing in the form depicted in FIG. 3 according to the data description in the XML document of FIG. 11;

FIG. 14 is a Javascript code listing of a binding routine that will exchange data received from a server machine with a control input box appearing in a form according to the data description in the XML document of FIG. 11;

FIGS. 15A, 15B, 15C, 15D, 15E, 15F, 15G and 15H, taken together, depict a sequential JavaScript code listing that will exchange XML data received from a server machine with a control such as a data list/combo box appearing in a form according to the data description in an XML document by populating the list from specified data items in the XML document and returning a user selection to a different data item in the XML document;

FIG. 16 depicts a JavaScript file listing that will insert a resolved XQL value into an XML element associated with a form;

FIG. 17 depicts a Javascript code listing that highlights those prompt elements in a form associated with a required XML element;

FIGS. 18A and 18B, taken together, depict a sequential Javascript code listing that determines which controls appearing in a form are pointing to a specific branch in an XML document;

FIGS. 19A and 19B, taken together, depict a sequential JavaScript code listing that highlights a specified control appearing in an XML document; and FIG. 20 depicts a JavaScript code listing that highlights the label of a specified control in an XML document.

DETAILED DESCRIPTION OF THE INVENTION

Figure 1:
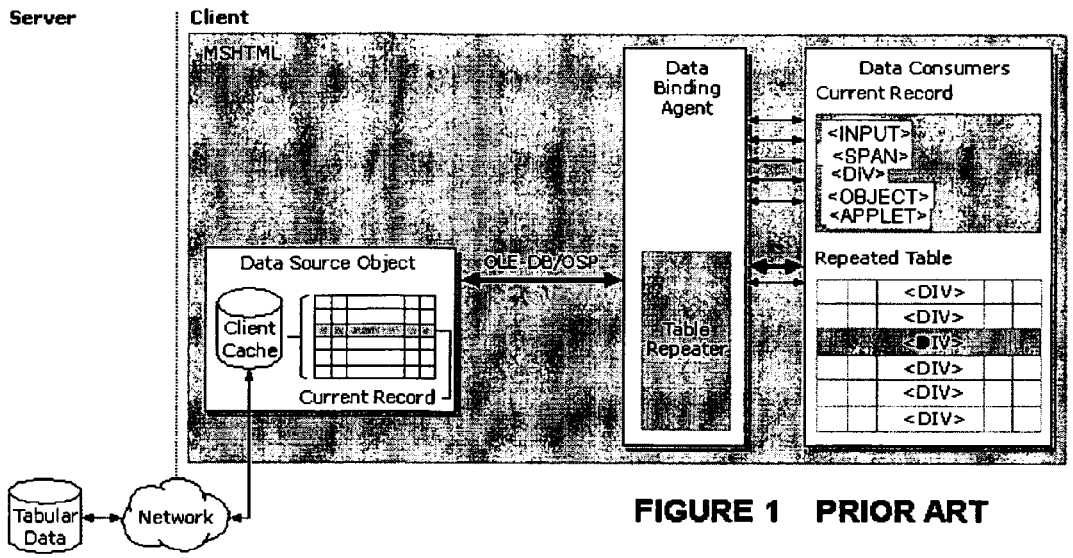
FIG. 1 is a block diagram of a prior art data binding component architecture.
Figure 2:
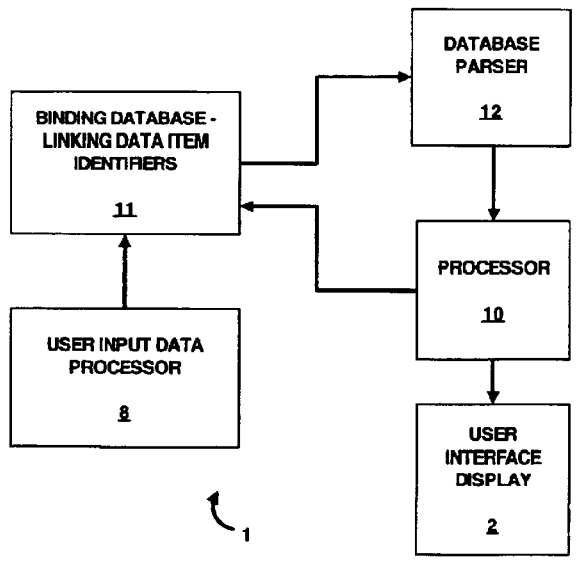
FIG. 2 is a block diagram of a dynamic data binding configuration system constructed according to the principles of the present invention.

FIG. 2 is a block diagram which depicts the processing system 1 of the present invention. The system 1 is implemented in a personal computer which contains software and hardware (not shown) permitting a connection to the internet or other network populated by other computers. Operation of the system begins with a user viewing information displayed on a monitor or other user interface display device 2. Various types of image elements may be visible on the screen 2. The image elements are typically part of a document, form, questionnaire, spreadsheet, web page or browser. Referring to FIG. 3, the display 2 depicts, for example, an HTML form 3 in which the image elements include various prompt elements, e.g. 4, 5, 6, 7, 14, 15, 16 and 17, arranged in a tabular orientation as they would appear on the user display interface 2. As illustrated, these prompt elements may be aligned vertically and/or horizontally. The form 3 includes a prompt element 4 in which a street address may be entered, a prompt element 5 in which a zip code may be entered, a prompt element 6 in which a state may be selected from a drop down or pick list type of menu, and a prompt element 7 in which a city may be entered, and so forth. This information forms a physical or mailing address. Data may be entered into the form 3 by the user and/or may be obtained from the Server machine when the form initially loads onto the computer.

The prompt elements 4, 5, 7, 14, 15 and 16 are a type of prompt element known as a text box, which can display text for a user, and accept textual data from a user. The text box type prompt element is associated with a data item from which it receives its initial data (if any), and into which the data entered by the user is inserted. The prompt elements 6 and 17 are a type of prompt element known as a combo-box. In a combo box, a list of acceptable data entries is presented to the user when the user activates the arrow button at the right side of the prompt element. For example, for prompt element 6, a list of U.S. states is presented to the user when the allow button is activated. The user can then select one of the acceptable data entries (e.g. one state) from that list. The selected data entry is then displayed in the display area making up the remainder (left hand side) of the prompt element. As before, the combo-box type prompt element may also be preloaded with initial data. The combo-box type prompt element, therefore, requires a source of data to provide the acceptable choices, and a data item from which it receive its initial data (if any), and into which the selected choice is inserted.

The HTML code defining form 3 is stored within the client personal computer, while the data populating the entry fields in the form is ultimately received from and subsequently transferred to other computers, such as a server machine, via the internet connection. FIGS. 10A, 10B, 10C and 10D, when joined together, are an example of an HTML code listing which defines such a form that may be stored on a personal computer. Within the HTML code is JavaScript code (lines 130–131) that will condition the personal computer to obtain data items residing on a Server machine at the time the form loads. Further JavaScript code (lines 132–133) conditions the personal computer to load these data items into an XML document embedded within the HTML document.

When user input data processor 8 (FIG. 2) receives user data intended for form 3 (FIG. 3) from, for example, a keyboard or mouse, the data is processed according to information, stored in a binding database 11, associated with the user input data. For example, referring to FIGS. 4, 6 and 7, the binding database 11 includes a binding table 13, and a first (40) and a second (41) data constraint table. The user input data processor 8 forwards the user data to binding database 11 where it is compared to information in the binding table 13 (FIG. 4) contained within the binding database 11. The binding table 13 in the binding database 11 associates data from the external server with corresponding prompt elements in the form 3 in a manner to be described in more detail below. The received user data is also compared to information in data constraint tables 40 and 41 to determine if the received value of the user input data meets data constraints (i.e. is it within proper range and/or does it coordinate properly with other data) in a manner also to be described in more detail below. If the user input data is within the appropriate constraints, it is forwarded to the processor 10 for subsequent display by the user interface display 2 and possible storage in the associated external data item. Conversely, if the data requires alteration and/or further processing before it may be properly entered in form 3, the processor 10 is conditioned to either perform the proper processing, or to inform the user of the problem via the user interface display 2 and solicit further information from the user via the user input data processor 8 to resolve the problem.

FIG. 4 illustrates a portion of a binding table 13 containing a plurality of entries, illustrated as rows. Each row specifies the linking of a data item with a prompt element. Within the binding table 13 each prompt element 14, 15, 16, and 17 is linked with at least one specified data item received from the server. The first column in binding table 13 identifies a prompt element on the form 3, and the third column identifies the data item from the external server to be linked with that prompt element via one or more data item identifiers 19, 20, 21, 22 and 23, each of which resolves to a set of data items. The second column identifies the type of the prompt element identified in the first column. In most cases there is only one data item identifier linked to each prompt element, and the data item identifier resolves to a set consisting of only one data item. In general, however, the data item can be a simple object property (such as the value of the object), an entire object (containing all of its properties) or an array (repeating group) of objects.

In a preferred embodiment of the present invention Microsoft XSL pattern syntax (previously known as XQL syntax) is used to represent the data item identifier. Microsoft documentation likens XSL Pattern syntax to SQL for use with XML, hence the original name of XQL (XML Query Language). XSL defines a "pattern" syntax which identifies nodes within an XML document. This capability provides the equivalent of an SQL WHERE clause. XSL is further discussed in *Professional XSL* by Kurt Cagle, Michael Corning et al., Wrox Press, Inc. (2001) ISBN 186-100-3579.

The XML data buffer tags (shown without any data entered) associated with the image elements or controls 4, 5, 6 and 7 appearing in form 3 would appear as follows:

```
<Patient>
    <Address>
        <AddressLine1/>
        <AddressLine2/>
        <City/>
        <State/>
        <ZipCode/>
    </Address>...
    <Address>...
    <Address>...
<Patient>
```

In the preceding example the data item identifier /Patient/Address/ZipCode resolves to a data item having one object property: the value of the zip code. The data item identifier /Patient/Address resolves to a data item that is an entire object containing several objects with their own properties (multiple lines of address information, plus City, State and ZipCode), and the data expression /Patient/Address[State=PA], for example, resolves to a data element which is an array composed of a repeating group of objects, i.e. those patients who live in Pennsylvania.

Thus, a data item identifier resolves to a data item or to some portion of data within the embedded XML document containing external data. In XML this reference is to a document node, that is, one branch of the XML document as illustrated, for example in FIG. 11. A data item identifier can represent the data source for a prompt element, the data target (destination) for a prompt element or both.

For example, a combo box needs a data item identifier which will resolve to a list of allowable choices and it also needs a data item identifier which will resolve to a location in the external data where the choice made by the user will be placed:

```
DataSource:    ListOfDoctors
DataTarget:    Patient/AttendingDoctor
```

Referring specifically to rows 30 and 31 of the binding table 13 (of FIG. 4), these rows both relate to the VIP status combo box 17, identified as prompt element 'ctlVIP' in the first column, and of type 'ComboBox' in the second column. The data item associated with the prompt element 'ctlVIP' 17 in row 30 is the source of the allowable values of the VIP status. In the illustrated embodiment, the allowable values are 'True' and 'False'. However, there is no limit to the number of allowable choices, and for the present example, the allowable values could indicate different levels of VIP status, such as: 'gold level', 'silver level', 'bronze level' and 'none'. This source data item is identified in cell 22 as existing at the location in the embedded XML document: '/AllowableValues/VIPStatuses' which contains a list of the allowable data items. As described above, this list would be retrieved as an array containing the allowable data. The data item linked with the prompt element 'ctlVIP' in row 31 is the destination data item for data entered by the user into the combo-box 17. This destination data item is identified in cell 23 as being at the location '/Patient/VIPStatus'.

Data item identifiers in the binding table 13 can be changed at runtime to allow for dynamic views, that is, to display subsets of available data in the buffer which change based on data entered into other prompt elements.

The data item identifier associated with a prompt element can be stored with that prompt element (i.e., in the HTML document defining the form containing that prompt element), with the data (i.e., in the embedded XML document) or separately. In a preferred embodiment of the present invention the most straightforward and flexible way to store the data item identifier information is separately in a data binding table 13, as illustrated in FIG. 4.

In FIG. 10B, the HTML code at line 127 begins the data binding process. The HTML code conditions the client computer to retrieve the external data from the server (line 130–131) via a server XML document, and loads the received external data into an XML document (line 132–133) which is embedded at line 106 into the form. FIGS. 11A and 11B depict the XML code listing for an exemplary XML document such as the XML document referenced at line 106.

Data items in the XML document are bound to prompt elements via JavaScript subroutines depicted in FIGS. 12, 13, 14 and 15. That is, these JavaScript subroutines perform the transfer of data between the data items in the embedded XML document and the associated prompt elements in the form. In order to accomplish this data binding process, the location of the data in the embedded XML document is linked with the prompt element where the data ultimately will be displayed and edited via binding table 13, as described above. The entries in the binding table 13 are defined in the HTML form (FIG. 10A) at lines 120–126. The entries illustrated in FIG. 10 represent only a portion of the binding table entries: those illustrated in FIG. 4. Lines 122–126 insert data into the binding table 13 to map the data items in the embedded XML document to the appropriate prompt elements via an XQL pattern or path that resolves to a node or nodes in the XML document.

The routine listed in FIG. 16 operates in conjunction with the code in the HTML document (FIG. 10) to populate the embedded XML document. This routine inserts data items from the XML document from the external source into the appropriate node in the embedded XML document to which the XQL resolves.

In FIG. 4 the binding table 13 links the XML data item from the embedded XML document, obtained at line 130 of the HTML form (FIG. 10), to the specific prompt elements that appear in the HTML document at lines 122–126. This scheme offers the advantage that more than one prompt element 14, 15, 16, etc. can be mapped in the same binding table 13. In addition, the binding table 13 can be quickly scanned to discern which prompt elements are bound to which data item, a necessary operation in order to refresh the display 2 for prompt elements whose data has changed. To aid in performing this necessary function, the JavaScript subroutine depicted in FIG. 18 determines which prompt elements are bound to a specific branch in the XML document.

Every prompt element (14, 15, 16, and 17) that is linked with a data item (19, 20, 21, 22 and 23) in the binding database 11 has at least one entry in binding table 13. Each prompt element is further associated with a generic binding routine based on the type (24, 25, 26, 27 and 28) of the prompt element. This generic binding routine performs the actual copying of the data between the embedded XML document and the linked prompt element. For example, the generic binding routine associated with prompt element types 24, 25 (InputBox) would be InputBox_XML_UI, where UI refers to the user interface (FIG. 13A, line 320). This generic binding routine transfers textual data between a specified text box prompt element and the data item in the embedded XML document to which it is linked.

Other examples of binding routines applicable to each type of control scenario are shown in FIGS. 12–15. FIG. 12 is an example of the routine which controls the binding the XML data to all of the linked prompt elements in the form. FIG. 13 is a routine which controls the binding of linked XML data to only a specified prompt element. FIG. 14 depicts the binding routine, described above, that will bind the XML data to a relatively simple control such as an input box, while FIG. 15 shows the binding routines for a relatively complex control such as a data list or combobox.

The rows 29, 30, 31 and 32 of binding table 13 (of FIG. 4) are an example of how prompt elements within one presentation group form can be linked with data items located within different object and/or record types. In this case, the four rows 29–32 are associated with three different record types, namely Person/Name 19, 20; Person/Education 21 and Patient 23.

Figure 5:
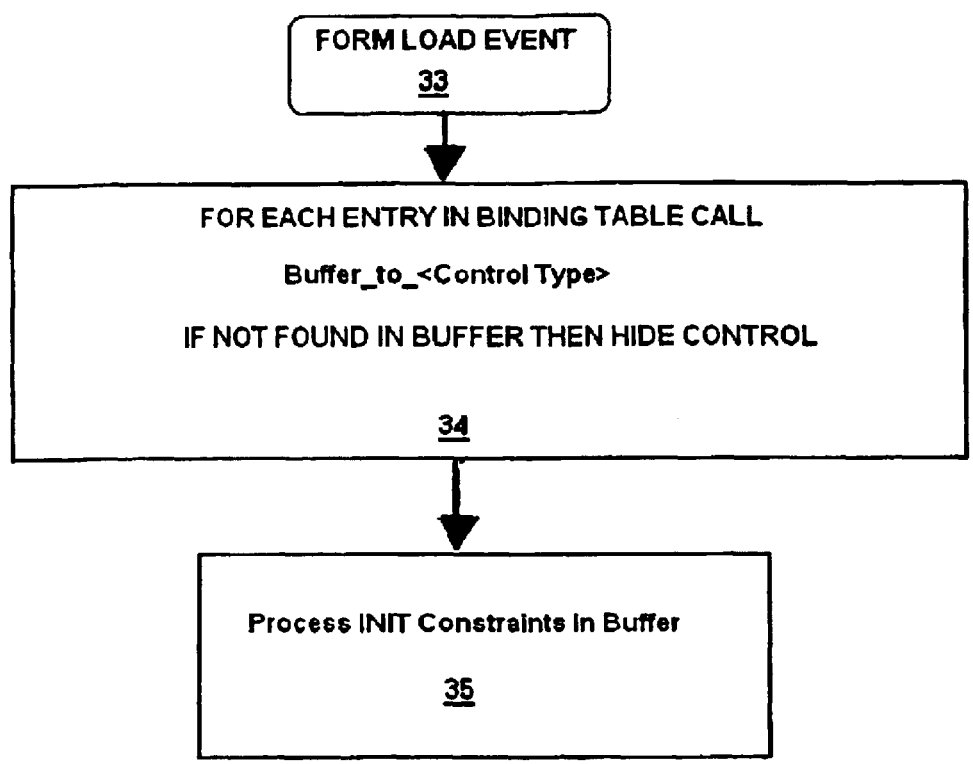
FIG. 5 is a flow chart depicting the initial form load processing steps of the present invention.

Data items are automatically read from the embedded XML document and written to each prompt element (4, 5, 6, 7) in the form 3 when the form 3 is initially loaded. As seen in FIG. 5, the loading of form 3 into the display interface 2 begins with Form Load Event 33. At step 34, the generic Buffer_to_<Control Type> routine is launched for each specific control type appearing in the Binding Table 13. For example, a ComboBox type prompt element would cause initiation (FIG. 13, line 322) of the routine XML_to_ComboBox (FIGS. 15A and 15B). Similarly, an InputBox type prompt element would cause initiation (FIG. 13, line 320) of the routine XML_to_InputBox (FIG. 14).

If the data item to which the prompt element is bound is not found in the embedded XML document, the associated controls are hidden. This feature allows a security layer to remove sensitive data from the embedded XML document or to prevent such data from ever reaching the buffer initially. Further, hiding of the unbound controls prevents the user interface from failing. Furthermore, hiding the control and the prompt for the control prevents the user from realizing that a potentially secure field even exists. When the control is hidden the control still occupies the same physical space on the display 2 so that other controls on the form 3 are not affected.

Following the scan at step 34 for entries in the binding table 13, step 35 processes the buffer initialization constraints appearing in table 40. Certain data constraints are static and can exist as part of the form 3. For example certain prompt elements may be linked to data items that are always required (e.g. 'Patient/Name/familyName' 19 and '/Patient/VIPStatus' 23). Also, certain pick lists (e.g. list of allowable VIP status values 6) can also contain values that do not often change.

In FIG. 6, table 40 depicts an example of data constraints 36 and 37 which are evaluated at the time of form initialization (INIT). When the form 3 initially loads, the constraints listed in "Action" column 38 are performed for any prompt element that maps to the data item identifiers appearing in column 39. In the example shown, the prompt element 17 (ctlVIP) will be marked as required and its associated control pick list will be populated with the values "True" and "False". INIT constraints 36, 37 are processed when the linked data items are initially loaded into the prompt elements. Since INIT constraints 36, 37 do not change after the form is initially opened, these constraints are never again processed.

Prompt elements are activated if their linked data item is relevant and inactivated if their linked data item is not relevant. Furthermore, prompt elements are highlighted if their linked data is marked as required. The routine depicted in FIG. 17 marks as required any prompt elements that are bound to an XML data item marked as being required. The routine shown in FIG. 19 highlights prompt elements marked as required, while FIG. 20 highlights the label (if any) of prompt elements which are marked as required. Similar routines (1) mark prompt elements as not relevant if their linked data item is irrelevant, and inactivate both the prompt element and the label (if any) of any prompt element marked irrelevant; and (2) mark prompt elements as relevant if their linked data item is relevant, and activate both the prompt element and the label (if any) of any prompt element marked relevant. One skilled in the art will understand how to generate code to provide these functions.

Another class of data constraint is extremely dynamic. In this case, the required data constraint is not known until runtime. For example, the allowable values in a pick list might change frequently enough that embedding such values into the form 3 is inappropriate. This includes constraints that may cause a data item to become e.g. either relevant, irrelevant or required as other data items (and the prompt elements with which they are linked) on the form are changed. For example, the data item last_PAP_Test_Date (not illustrated in FIG. 3) is required if the patient gender (also not illustrated in FIG. 3) is FEMALE. Conversely, if the patient gender is MALE then last_PAP_Test_Date is irrelevant and should not be entered. This class of data constraint needs to be evaluated after each data item that is linked with the underlying condition is changed.

For example, as soon as the patient gender is changed to MALE, the data item last_PAP_Test_Date becomes irrelevant and each prompt element that is bound to the last_PAP_Test_Date data item is inactivated. Conversely, as soon as the patient gender is changed to FEMALE, the data item last_PAP_Test_Date becomes relevant and required and each prompt element that is bound to the last_PAP_Test_Date data item is activated and highlighted. In FIG. 7, table 41 depicts an example of data constraints which are dynamically evaluated as data is changed on a form. This type of data constraint is marked in the first column to be evaluated at ONCHANGE time and the data items participating in the condition 45 are listed in column 43. Whenever data is changed on the form, the table 41 is scanned to determine if the changed data item matches any data items listed in column 43. If so, the changed data item must be checked against an associated condition, listed in column 45. If the associated condition is met, the associated actions listed in column 44 are performed.

For example, if /Patient/Sex is the data item that is changed, then both of the entries illustrated in table 41 of FIG. 7 will be triggered, causing their conditions in column 45 to be evaluated. If the condition of column 45 produces a TRUE result, then the corresponding action of column 44 will be performed. Referring specifically to the top row, if the /Patient/Sex changes to "F" (Female) then any prompt element bound to last_PAP_Test_Date (column 42) will be set to "Required". Referring to the second row, if the /Patient/Sex changes to "M" (Male) any prompt element bound to last_PAP_Test_Date will be inactivated. Similar processing may be performed with respect to a combo-box to change the allowable entries based on a change in data in some other prompt element.

One skilled in the art will recognize that, not only can input data be made subject to conditions, as described above with reference to table 41 of FIG. 7, but also that the conditions themselves can be dynamically variable. That is, the entries in table 41 may be varied in response to coding in the HTML document defining form 3. For example, one of the actions which may be specified in column 44 of table 41 may be to add a row in table 41, delete a row in table 41, or to change the contents of entries in table 41, all in response to the value of the newly received user input data from input data processor 8.

As data is entered or changed in any prompt element, the new data is automatically inserted into its associated location in the embedded XML document containing the external data item. More specifically, data input events, such as change and click events, are routed to known generic event handling routines. The generic event handling routines for each prompt element move the data from the prompt element to the embedded XML document. An example of the appropriate instruction is:

<ControlType>_To_Buffer

When data is updated in this manner, the processor 10 detects that the previous version of the updated data item is different from the current version of that data item. The mechanism used to identify such data is to mark that data item as used or "dirty". That is, whenever a user enters new data or updates existing data, that data is marked 'dirty'. This can then be used to assist server processing.

Any data object in the XML document that was originally null (i.e. any XML document node which has no data initially associated with it) is tagged as a placeholder until data is placed into that data object in response to a change in the linked prompt element. Placeholders (new data objects) in the XML document are marked as "Insert" when new data is placed in them. More specifically, once a data object is marked dirty, then that data object is marked as a new object, that is, an object into which data is to be inserted. Any parent (an object containing the new object) placeholder objects are also marked "Insert". Existing objects, i.e. any node already containing data, are marked as "Update" when new data is placed in them. In addition, previous data values can be saved in a list to support "undo" processing.

If a subset of the external data is updated from a source other than the prompt elements, e.g. from a data update from the internet, only those prompt elements that are affected by the changed data are rebound. That is, such partial database updates rebind only the relevant prompt elements. The XML nodes of the data changed are compared to the data item identifiers (19–23) in the binding table 13 and only those prompt elements whose linked data item identifiers fall within the changed data path are updated.

As the user interacts with the prompt elements (4, 5, 6, 7, 14, 15, 16 and 17) of the HTML form 3, the data in at least some of the prompt elements changes. The DHTML browser will initiate events that are directed to the prompt element event handlers, some of which are in the HTML document itself (FIG. 10B, line 137 to FIG. 10D line 190). Some of the event handlers are so generic that they reside in JavaScript files. The prompt element event handlers generally extract the changed data from the prompt element and update the linked node in the XML document. For example, in FIG. 10C (lines 154–164) when the data in the zip code control 5 is changed by the user, line 162 updates the XML document with the new zip code (InputBox_UI_TO_XML (control)).

Optional custom code may be associated with the generic event handlers. For example, additional program code may be invoked by creating event handling functions using a specific naming convention (<controlName>_ <eventName>). The generic event handling routines will search at runtime for the existence of additional custom functions and, if found, invoke those functions instead of executing their genetic functions. An example of custom logic that may be added before or after data updating is as follows:

```
function ctlZipCode_onchange(aNumericEdit)
{
    // do custom validation here
    if passMyValidation(aNumericEdit) == false
        return; //abort buffer updating
    //otherwise let the system update the XML doc
    this.UI_TO_XML( );
}
function ctlZipCode_onafterchange(aNumericEdit)
{
    //custom code here
    DoSomething( ); //Verify City and State?
}
```

Figure 8:
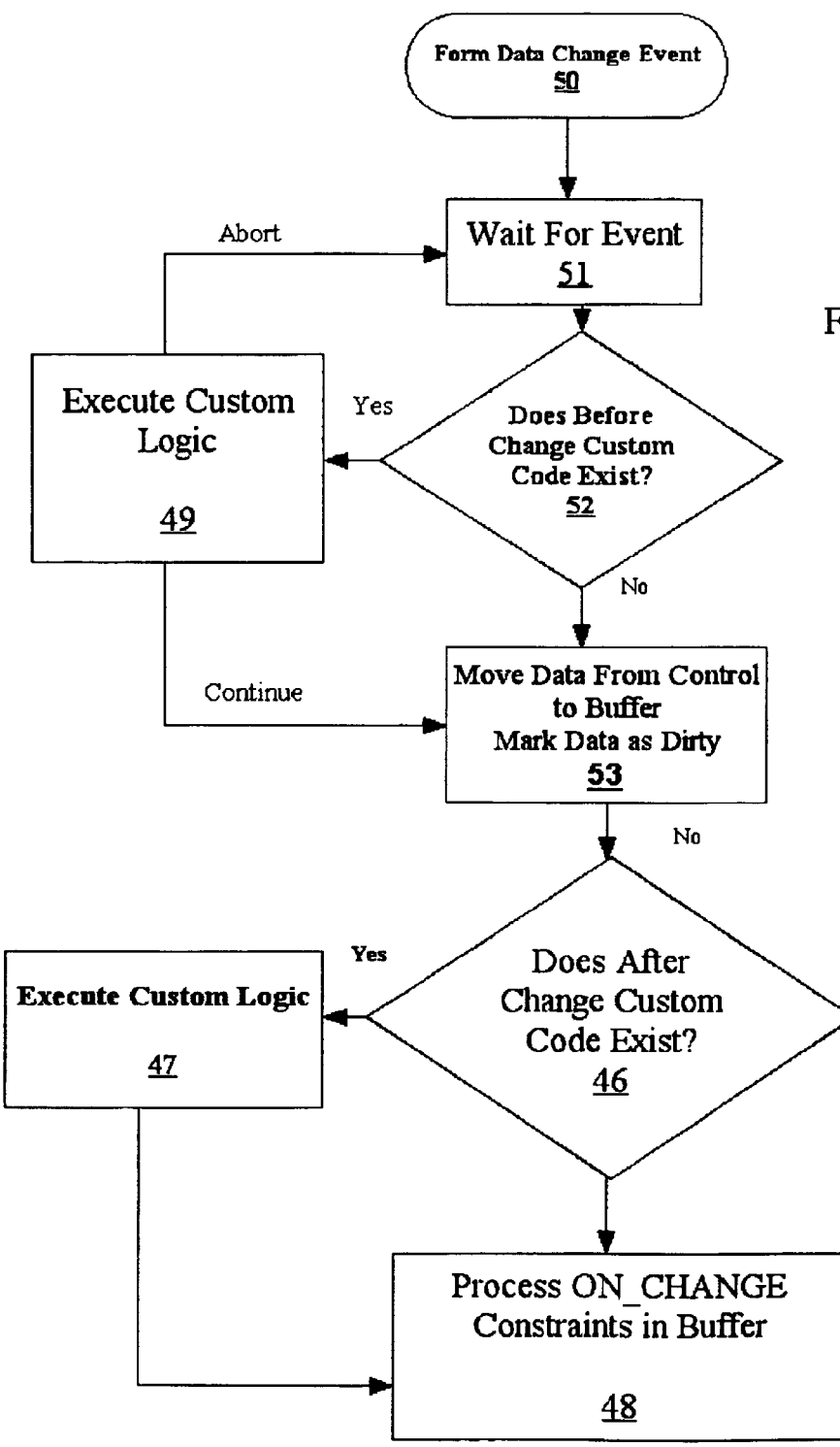
FIG. 8 is a flow chart depicting the processing of a form after form data has been altered.

Referring to FIG. 8, the form data change processing model described above is illustrated. The form data change event handler 50 begins with waiting for a data change event to occur at step 51. At step 52 the subroutine searches for the presence of custom pre-change code before changing the data in the database 11. If such custom code is found to exist, step 49 executes the custom code. If no such custom code is found, the data is moved to the XML document at step 53 using the generic binding routines so that the data may eventually be sent back to the Server machine. After the data change is executed, another search is performed at step 46 for the existence of custom post-change code. If such custom code is found it is executed at step 47. If no such custom code is found, then in the processing at step 48, the ON_CHANGE constraints in the data constraints table 41 of binding database It are evaluated and if any are triggered, they are executed. The routine depicted in FIG. 9 is a JavaScript code listing which examines the data runtime for ON_CHANGE validations for the selected control.

The instruction loop depicted in FIG. 8 exists for each prompt element. As seen in FIG. 10, the HTML form data change instructions appear at lines 138–147 for the "street" data, at lines 148–153 for the "address" data, at lines 154–166 for "zip code" data and at lines 178–190 for "city" data.

User written functions 49 can implement custom (more restrictive) validation logic which can cause the data binding to be cancelled (data is not written into the database 11) by simply coding a "return" statement. User written functions 47 can be implemented which are invoked after the data is written to the database 11 in order to cause or perform some post data change task such as data transmission.

What is claimed is:

1. A system for dynamically configuring a user interface display including image elements for prompting user data entry, comprising:

an input data processor for receiving input data via a prompt element for display in a user interface;

a database associating a condition with an input data item received via said prompt element and with at least one of a plurality of different actions altering a corresponding plurality of different characteristics of image elements in a user interface display wherein said database associates a dynamically variable condition with said input data item, said dynamically variable condition being subject to being at least one of, (a) deleted and (b) modified in response to said input data item; and an image element processor for using said database in determining whether said received input data item satisfies said condition and altering said different characteristics including by at least one of, (a) activating an image element and (b) indicating data entry in an image element is mandatory in the user interface display in response to said determination.

2. A system according to claim 1, wherein said database comprises a table.

3. A system according to claim 1, wherein said database also associates a data item destination identifier with said input data item received via said prompt element, said data item destination identifier identifying a destination data record for accommodating said identified data item.

4. A system according to claim 1, wherein said database also associates a data item destination identifier with said input data item received via said prompt element, said data item destination identifier identifying a destination data record for accommodating said data item and said activating said image element in said displayed user interface comprises (i) displaying said image element in said displayed user interface and (ii) making said image element responsive to user command.

5. A system according to claim 1, wherein said database further associates a type parameter with said input data item received via said prompt element, said type parameter identifying a displayed prompt element type.

6. A system according to claim 5, wherein said prompt element type signifying said prompt element supports at least one of, (a) receiving input data, (b) providing a user selectable set of input items, (c) receiving date data, (d) receiving address data, (e) receiving personal information and (f) receiving user identification and authentication information.

7. A system according to claim 1, wherein said user interface display comprises at least one of, (a) a document, (b) a form, (c) a questionnaire, (d) a spreadsheet, (e) web page and (f) a browser.

8. A system for dynamically configuring a user interface display including image elements for prompting user data entry, comprising:

an input data processor for receiving input data via a prompt element for display in a user interface;

a database associating a plurality of conditions with an input data item received via said prompt element and with a plurality of different actions altering a corresponding plurality of different characteristics of image elements in a user interface display wherein said plurality of conditions include a dynamically variable condition subject to being at least one of, (a) deleted and (b) modified in response to said input data item; and an image element processor for using said database in determining whether said received input data item satisfies said plurality of conditions and altering said different characteristics including by at least one of, (a) activating an image element and (b) indicating data entry in an image element is mandatory in the user interface display in response to said determination.

9. A system according to claim 8, wherein said plurality of conditions include a condition dynamically added in response to said input data item.

10. A system according to claim 8, wherein said plurality of conditions include a condition for determining whether said received input data item represents a particular selection from between displayed alternative options.

11. A system for dynamically configuring a user interface display including image elements for prompting user data entry, comprising:

an input processor for receiving an input data item via a prompt element for display in a user interface;

a database associating a plurality of conditions with said input data item and with a plurality of different actions altering a corresponding plurality of different characteristics of image elements in a user interface display, said plurality of conditions including a dynamically variable condition subject to being at least one of, (a) added and (b) modified in response to said input data item; and an image element processor for using said database in altering a characteristic of an image element in said user interface display in response to said dynamically variable condition.

12. A system according to claim 11, wherein said dynamically variable condition is subject to being deleted in response to said input data item and said dynamically variable condition is provided to said database at least one of (a) prior to display of said a user interface and (b) during display of said user interface.

13. A system according to claim 11, wherein said input processor receives input data updating previously entered data and indicates said previously entered data has been updated.

14. A system according to claim 11, wherein said database also associates a data item destination identifier with said prompt element, said data item destination identifier identifying a destination data record for accommodating said identified data item.

15. A processing system for use with a user interface display including image elements for prompting user data entry, comprising:

a database linking a plurality of data item identifiers with a single prompt element of a user interface display image, said plurality of data item identifiers including first and second data item identifiers and associating a plurality of conditions with said prompt element and with a plurality of different actions altering a corresponding plurality of different characteristics of image elements in a user interface display, said plurality of conditions including a dynamically variable condition subject to being at least one of, (a) added and (b) modified in response to said input data item; and a processor for using said first data item identifier to identify a set of data items comprising items individually selectable for entry by a user via said single prompt element and for using said second data item identifier to identify a destination data record for accommodating a data item entered via said single prompt element.

16. A method for dynamically configuring a user interface display including image elements for prompting user data entry, comprising the steps of:

receiving input data via a prompt element for display in a user interface;

associating a condition with an input data item received via said prompt element and with a plurality of different actions altering a corresponding plurality of different characteristics of image elements in a user interface display wherein said plurality of conditions include a dynamically variable condition subject to being at least one of, (a) deleted and (b) modified in response to said input data item; and determining whether said received input data item satisfies said condition and altering said different characteristics including by at least one of, (a) activating an image element and (b) indicating data entry in an image element is mandatory in a user interface display in response to said determination.

17. A method for dynamically configuring a user interface display including image elements for prompting user data entry, comprising the steps of:

receiving input data via a prompt element for display in a user interface;

associating a plurality of conditions with said input data item and with a plurality of different actions altering a corresponding plurality of different characteristics of image elements in a user interface display, said plurality of conditions including a dynamically variable condition subject to being at least one of, (a) added and (b) modified in response to said input data item; and altering a characteristic of an image element in said user interface display in response to said dynamically variable condition.

* * * * *